(12) United States Patent
Johnson et al.

(10) Patent No.: US 8,290,156 B2
(45) Date of Patent: Oct. 16, 2012

(54) COMMUNICATING MEDIA CONTENT FROM A DVR TO A PORTABLE DEVICE

(75) Inventors: Gerald R. Johnson, Cataumet, MA (US); Petr Peterka, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 526 days.

(21) Appl. No.: 12/465,676

(22) Filed: May 14, 2009

(65) Prior Publication Data
US 2009/0285391 A1 Nov. 19, 2009

Related U.S. Application Data

(60) Provisional application No. 61/053,929, filed on May 16, 2008.

(51) Int. Cl.
*H04N 7/167* (2011.01)
(52) U.S. Cl. .......... 380/200; 380/255; 380/278; 380/44; 380/277
(58) Field of Classification Search .................. 380/201, 380/277, 200, 255, 278, 44
See application file for complete search history.

(56) References Cited

U.S. PATENT DOCUMENTS

| | | | | |
|---|---|---|---|---|
| 7,769,641 B2* | 8/2010 | Jouret et al. | ................. | 705/26.1 |
| 7,861,312 B2* | 12/2010 | Lee et al. | ...................... | 726/27 |
| 2006/0053080 A1 | 3/2006 | Edmonson et al. | | |
| 2007/0150963 A1* | 6/2007 | Lee et al. | ......................... | 726/27 |
| 2007/0294178 A1* | 12/2007 | Pinder et al. | .................... | 705/57 |
| 2008/0015997 A1* | 1/2008 | Moroney et al. | ................ | 705/51 |
| 2008/0040609 A1* | 2/2008 | Giobbi | ......................... | 713/182 |
| 2008/0112405 A1 | 5/2008 | Cholas et al. | | |
| 2008/0120652 A1* | 5/2008 | Guzman et al. | ................ | 725/59 |
| 2008/0120656 A1* | 5/2008 | Jupin | .............................. | 725/70 |
| 2008/0267398 A1* | 10/2008 | Peterka et al. | ............... | 380/200 |
| 2008/0294775 A1 | 11/2008 | Roberts et al. | | |
| 2009/0007240 A1* | 1/2009 | Vantalon et al. | .................. | 726/4 |
| 2009/0012805 A1* | 1/2009 | Schnell et al. | .................... | 705/1 |
| 2009/0019492 A1 | 1/2009 | Grasset | | |
| 2009/0177884 A1* | 7/2009 | Bieh et al. | ...................... | 713/168 |
| 2010/0125879 A1* | 5/2010 | Peterka et al. | .................. | 725/87 |

OTHER PUBLICATIONS

PCT Search Report and Written Opinion, RE: Application #PCT/US09/44107 Jul. 1, 2009.
Notice of Preliminary Rejection for Korean Patent Application No. 10-2010-7025713, dated May 9, 2012. (foreign text).
Notice of Preliminary Rejection for Korean Patent Application No. 10-2010-7025713, dated May 9, 2012. (english translation).

* cited by examiner

*Primary Examiner* — Krisna Lim
(74) *Attorney, Agent, or Firm* — Susan R. Payne

(57) ABSTRACT

In a method for communicating media content stored on a digital video recorder (DVR) protected by a first DRM system to a portable multimedia device (PMD) using a second DRM system, in which the first DRM system differs from the second DRM system, a request for communication of a media content item stored on the DVR to the PMD is received. In addition, a portable content key is employed to encrypt the media content item to a PMD format suitable content version and the encrypted PMD format suitable content version is communicated to the PMD along with a portable content identifier (ID).

20 Claims, 6 Drawing Sheets

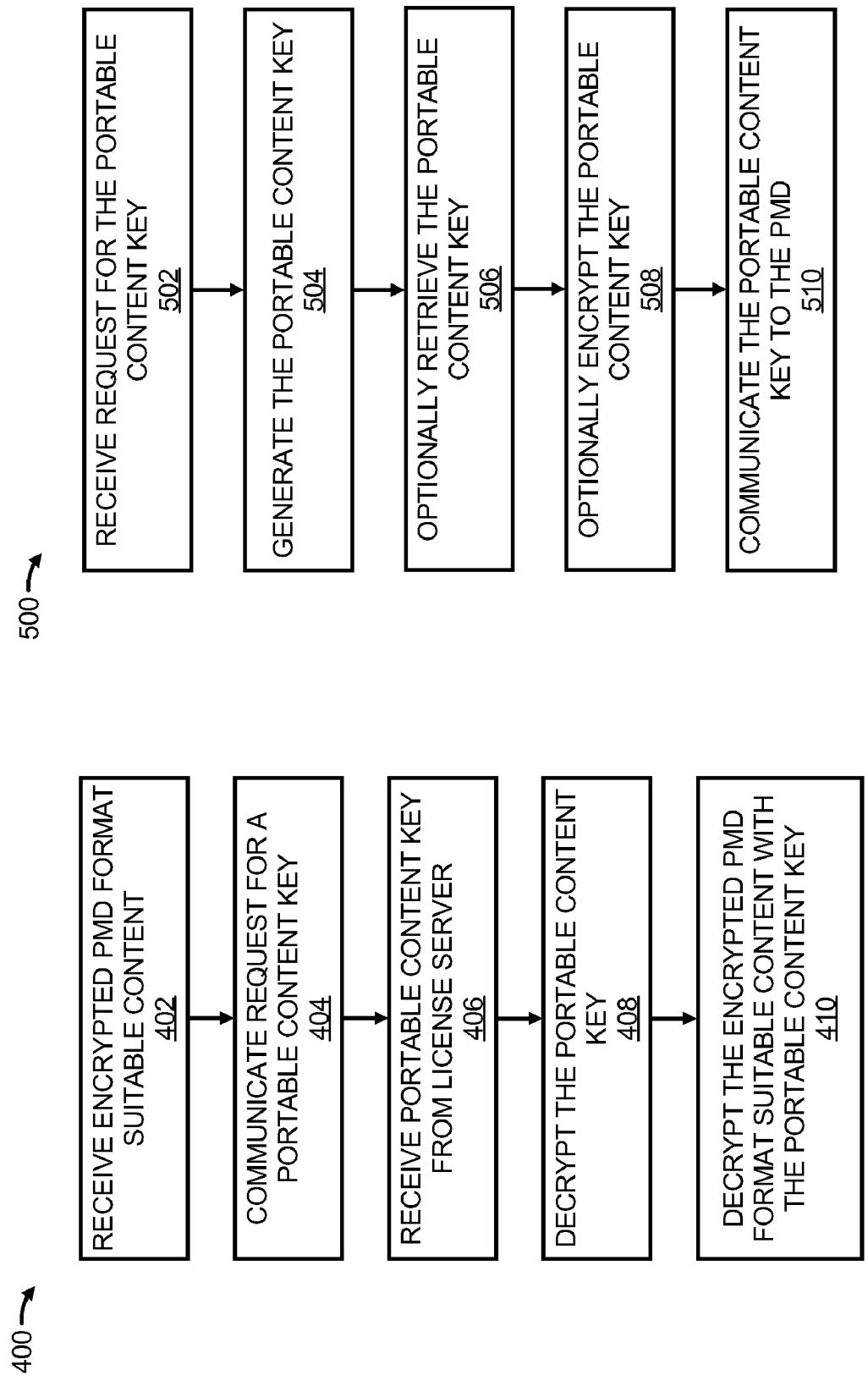

COMMUNICATING MEDIA CONTENT FROM A DVR TO A PORTABLE DEVICE

CLAIM OF PRIORITY

The present application claims the benefit of priority to U.S. Provisional Patent Application Ser. No. 61/053,929, filed on May 16, 2008, entitled "Method to Obtain Content Keys to Enable Transcoding", the disclosure of which is hereby incorporated by reference in its entirety.

BACKGROUND

There has been substantial growth in the use of set-top boxes (STBs) equipped with digital video recording capabilities. Users often record content, such as, television programs, onto the digital video recorder (DVR), which is often referred to as a personal video recorder (PVR). The users are then able to view the recorded content at a later time on a monitor to which the DVR is connected. Oftentimes, however, users would like to copy the recorded content onto a portable multimedia device (PMD) or a portable media player (PMP), such as, a laptop computer, a personal digital assistant (PDA), and a cellular telephone.

Directly copying of the content recorded on the DVR onto the PMDs is often limited by a number of factors. One of these factors is that the format in which the content is recorded onto the DVR is typically incompatible with the playback formats of the PMDs and thus, even if the PMDs are able to store the content recorded on the DVR, the PMDs are typically incapable of playing the content. Another factor is that the PMDs are often equipped with a different digital rights management (DRM) system than the DRM system that manages digital rights of media content stored and played on the DVR. The DRM systems typically prevent unauthorized copying of content onto and playback of the content on the PMDs.

SUMMARY

Disclosed herein is a method for communicating media content stored on a digital video recorder (DVR) protected by a first digital rights management (DRM) system to a portable multimedia device (PMD) using a second DRM system, in which the first DRM system differs from the second DRM system. It is assumed that the DRM used by the PMD is typically used to get a content decryption key, for instance, in the form of a license, from a license server, but the PMD may not know how to get the content decryption key from the DVR. In the method, a request for communication of the media content stored on the DVR to the PMD is received. In addition, a portable content key is employed to encrypt the content to a format suitable for the PMD and the encrypted PMD format suitable content version to the PMD is communicated to the PMD along with a portable content identifier (or portable content ID).

Also disclosed is a rights manager for managing rights to media content from a first digital rights management (DRM) format suitable for a digital video recorder (DVR) to a second DRM format suitable for a portable multimedia device (PMD). The rights manager includes a module for receiving a media content identification (ID) of the media content stored on the DVR, a module for encrypting a PMD format suitable content version of a media content item using a portable content key, and a module for communicating the encrypted PMD format suitable content version to the PMD.

Also disclosed is a method for communicating a content key from the DVR to the license server. This is useful when the content on the DVR does not have to be transcoded and re-encrypted with a new content key for the media content to be received and played back in a PMD. In this method, the content key that protects the content stored on the DVR is communicated to the license server such that the PMD may rely upon the communication channel used by the DVR to request a content key from the license server to receive the content key. This allows the DRM system on the PMD to work without modifications or integration with the DRM system on the DVR.

Further disclosed is a computer readable storage medium on which is embedded one or more computer programs, the one or more computer programs implementing a method for communicating media content stored on a digital video recorder (DVR) protected by a first DRM system to a portable multimedia device (PMD) using a second DRM system, wherein the first DRM system differs from said second DRM system. The one or more computer programs include a set of instructions for (a) receiving a request for communication of a media content item stored on the DVR to the PMD; (b) employing a portable content key to encrypt the media content item to a PMD format suitable content version; and (c) communicating the encrypted PMD format suitable content version to the PMD along with a portable content identifier (ID).

Commercial content on PMDs is often protected by one or more DRM systems, which substantially restrict the copy and playback of media content on the PMDs. Thus, PMDs are typically unable to readily playback media content originally copied from another device, such as, a DVR. Through implementation of the embodiments disclosed in the present invention, media content stored on a DVR may be readily copied and accessed on a PMD, while complying with the one or more DRM systems that protect content on the PMD.

BRIEF DESCRIPTION OF THE DRAWINGS

Embodiments are illustrated by way of example and not limited in the following figure(s), in which like numerals indicate like elements, in which:

FIG. 4 illustrates a flow diagram of a method of enabling media content from the DVR to be accessed in the PMD, according to an embodiment;

FIG. 5 illustrates a method of generating and communicating a portable content key, according to an embodiment.

DETAILED DESCRIPTION

Figure 1:
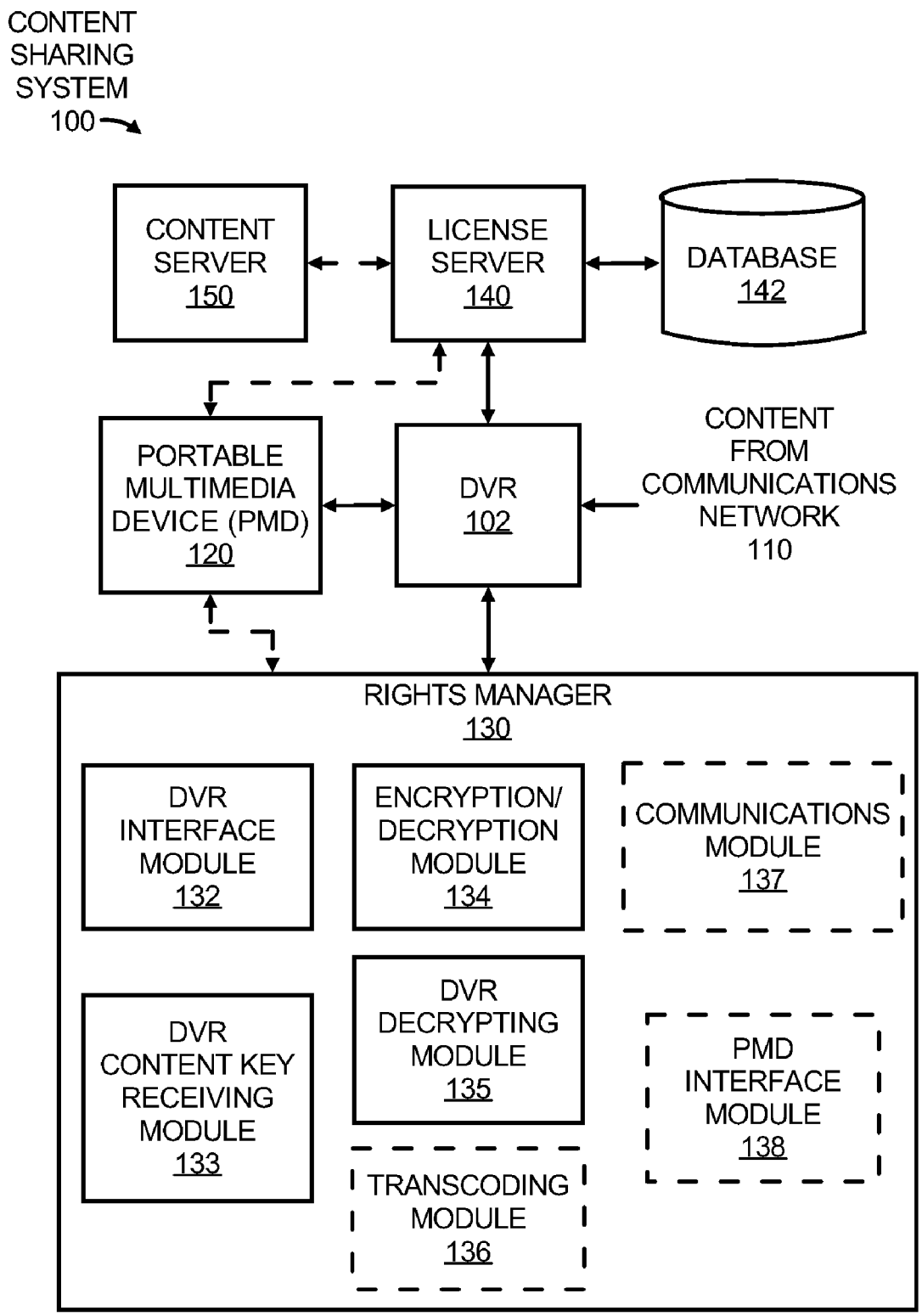
FIG. 1 illustrates a block diagram of a content sharing system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

For purposes of the present disclosure, it is assumed that the portable multimedia device PMD or portable media player (PMP), which are discussed interchangeably herein, is equipped with an existing, possibly standardized, digital rights management (DRM) system that cannot be easily modified or extended. Examples of suitable DRM systems include, for instance, WMDRM-PD, OMA DRM v2, Marlin, etc. These DRM systems typically identify protected content, use a content ID (or a content key ID) to request the content key and associated DRM rights from a license server. The license server or a Rights Issuer typically deliver the key and the rights in the form of a License or a Rights Object. Such DRM systems cannot be easily used to obtain content that does not originate from the service provider's content server, such as, from a digital video recorder (DVR) or a personal video recorder (PVR), which are also discussed interchangeably herein, in the user's home.

Disclosed herein is a method for translating the digital rights for the media content stored on a DVR to a PMD. More particularly, the rights are translated to enable the media content to be accessed and played on a PMD that is protected by one or more DRM systems. The DVR content may be converted to a format more suitable for playback on a PMD, for instance, it may be transcoded to another video or audio format, different file format, and transcrypted (re-encrypted) using a different content key or a different encryption algorithm.

As used herein, the term "content identification (ID)" generally refers to a substantially unique identification value assigned to media content items stored on the DVR. In the context of a DRM system, it is typically used to identify the associated content key.

The term "content key" generally refers to a content encryption key suitable for protection (or encryption) of media content during its transfer from the source (e.g., a content server or a DVR) to a destination client device such, as a PMD, and for protection of the media content while it is stored on the DVR or on the PMD. The same key may be used to decrypt the content while it is played back on the client device. A content key is typically associated with a set of rights or restrictions that the DRM system employed by the device checks before DRM system allows the content to be decrypted and played back on the device.

The term "DVR content key" here refers to a content key used by the DRM system on the DVR to protect, such as, by decrypting and/or encrypting, the content stored on the DVR.

The term "portable content key" here refers to a content key suitable for decrypting and/or encrypting the media content copied to and stored on the PMD. Unless otherwise specified, the term "content key" in this disclosure refers to the "portable content key".

With reference first to FIG. 1, there is shown a block diagram of a content sharing system 100, according to an example. It should be understood that the following description of the content sharing system 100 is but one manner of a variety of different manners in which such a content sharing system 100 may be configured and operated. In addition, it should be understood that the content sharing system 100 may include additional components and that some of the components described may be removed and/or modified without departing from a scope of the content sharing system 100.

The content sharing system 100 is depicted as including a digital video recorder (DVR) 102, which is also often referred to as a personal video recorder (PVR). The DVR 102 is generally configured to operate as a set-top box (STB) and is thus operable to be connected to a content provider, such as, a cable service provider, a satellite service provider, IPTV provider, etc., through a communications network 110. The communications network 110 may, for instance, include a broadband connection to the content provider, such as, over optical fiber, hybrid fiber coaxial cable network, satellite signals, terrestrial signals, etc. The communications network 110 may also include a cable modem, an integrated services digital network modem, a digital subscriber line modem, etc., that enables the DVR 102 to communicate to the content provider over the communications network 110.

In any regard, the DVR 102 receives media content, such as, network television programs, pay-per-view movies, pay-per-view events, video on demand, video file downloads, etc., from the content provider through the communications network 110. The media content is typically encrypted and protected using a digital rights management (DRM) system. More particularly, the media content is often encrypted and the DVR 102 typically includes hardware and/or software configured to decrypt the encrypted media content for playback by and/or storage on the DVR 102. The media content may be protected by a DRM system in the service provider's head-end and delivered to the DVR 102 in that format. Alternatively, the media content is delivered from the head-end using a conditional access (CA) system, which may be terminated by the DVR and the media content is securely protected by the DVR local DRM system by decrypting the CA signal and encrypting the recording with a unique content key generated by the DVR's DRM system.

The DRM requirements also often define limitations on the number of times that the media content may be copied, if at all. The DVR 102 is thus configured to perform one or more conventional encryption/decryption operations on the media content to ensure compliance with the DRM requirements.

The content sharing system 100 also includes a portable multimedia device (PMD) 120, which is depicted as being in communication with the DVR 102. The PMD 120 may be any suitable apparatus capable of storage and playback of media content, such as, a hand-held computer, a laptop computer, a personal digital assistant (PDA), a mobile telephone, etc. The PMD 120 may support one or more DRM systems in order to store and playback protected media content, as discussed in greater detail herein below.

In addition, the PMD 120 may be placed into communication with the DVR 102 through any suitable wired or wireless connection, such as, over a universal serial bus (USB) connection, a Bluetooth, MoCA, WiFi, Ethernet connection, etc., or through use of a removable device, such as an SD Card. In instances where the DVR 102 is connected to a network, such as a wired or wireless network, the PMD 120 may also communicate with the DVR 102 over the network.

The content sharing system 100 is further depicted as including a rights manager 130 configured to transform the media content from a DRM format suitable for the DVR 102 to a DRM format that is suitable for the PMD 120. The DRM format suitable for the PMD 120 comprises a format that complies with a digital rights management system of the PMD 120. Thus, by way of example, the suitable format may comprise a format that operates under the Windows™ Media DRM (WMDRM) system for portable devices, otherwise known as "Janus" or its newer version PlayReady. Other known DRM systems include OMA DRM v1 and v2, Marlin, Apple's FairPlay, Motorola's IPRM, etc. These DRM systems typically download content from the content server and request a license, which includes the content key and the DRM rights, from the license server. This mechanism does not work, however, when the content is downloaded from the DVR 102 instead of the content server especially if the content on the DVR is protected by a DRM system that generated the content key locally while recording live TV content; therefore the content and the content key is not known to the license server.

According to an embodiment, the rights manager 130 is an apparatus that is external to the DVR 102, such as a dongle, that may be connected to the DVR 102 through, for instance, a USB connection. According to another embodiment, the rights manager 130 comprises circuitry within the DVR 102 and is thus integrated with the DVR 102. According to a further embodiment, the rights manager 130 comprises software stored in a memory or other computer readable storage medium of the DVR or a device external to the DVR that is executable by a computer processor. Thus, although the rights manager 130 has been depicted in FIG. 1 as being separate from and connected to the DVR 102, it should be understood that the rights manager 130 may be integrated with the DVR 102 without departing from a scope of the content sharing system 100 disclosed herein.

As further depicted in FIG. 1, the rights manager 130 includes a DVR interface module 132, an optional DVR content key receiving module 133, an optional DVR format suitable content version decrypting module 135, an optional encryption/decryption module 134, an optional transcoding module 136, an optional communications module 137, and an optional PMD interface module 138. The transcoding module 136 is considered optional because in some instances, the media content to be communicated to the PMD 120 need not be transcoded. The encryption/decryption module 134 is considered optional because in some instances, the media content to be communicated to the PMD 120 need not be re-encrypted. The communications module 137 is considered optional because in some instances, the rights manager 130 may communicate to the license server 140 through an interface provided in the DVR 102. In other instances, the rights manager 130 may communicate directly to the license server 140 and may thus include the communications module 137. The PMD interface module 138 is considered to be optional because in some instances, the rights manager 130 may communicate to the PMD 120 through the DVR 102. In other instances, the rights manager 130 may communicate directly to the PMD 120 and may thus include the PMD interface module 138. In any event, a secure protocol may be employed for communications between the rights manager 130 and the DVR 102.

The modules 132-138 may comprise hardware modules, software modules, or a combination of hardware and software modules. Thus, one or more the modules 132-138 may comprise circuitry and/or software configured to perform various functions in the rights manager 130. The various functions that the modules 132-138 are configured to perform are discussed in detail herein below.

The content sharing system 100 further includes a license server 140, database 142, and a content server 150. Generally speaking, the license server 140 may be a combination of the standard license server associated with the DRM system employed by the PMD 120 with an extension functionality that is capable of securely communicating with the DVR 102, preferably using the DRM system employed by the DVR 102, such as, for instance, the Motorola IPRM system. The license server 140 is depicted as being in communication with the DVR 102, and optionally, in communication with the PMD 120. Although not shown, the license server 140 may be in communication with a plurality of DVR's 102 and PMDs 120.

The DVR 102 may be configured to communicate with the license server 140 through any suitable connection, such as, through the communications network 110, through an Internet connection, etc. The direct connection between the PMD 120 and the license server 140 is considered to be optional because the PMD may be configured to communicate with the license server 140 through the connection with the DVR 102. However, in instances where the PMD 120 is configured to communicate directly with the license server 140, the connection may be made through the Internet, over a cellular network, etc. In any event, a secure protocol may be employed for communications between the rights manager 130/DVR 102 and the license server 140.

Various manners in which the components of the content sharing system 100 depicted in FIG. 1 operate with respect to each other to enable access to media content stored on the DVR 102 with the PMD 120 is described with respect to the methods 200-500 depicted in FIGS. 2A-5. The methods 200-500 are described with respect to FIG. 1 by way of example and not of limitation. It will thus be apparent to one of ordinary skill in the art that the methods 200-500 may be performed with systems other than the content sharing system 100 depicted in FIG. 1. In addition, it should be apparent to those of ordinary skill in the art that the methods 200-500 represent generalized illustrations and that other steps may be added or existing steps may be removed, modified or rearranged without departing from scopes of the methods 200-500.

Figure 2A:
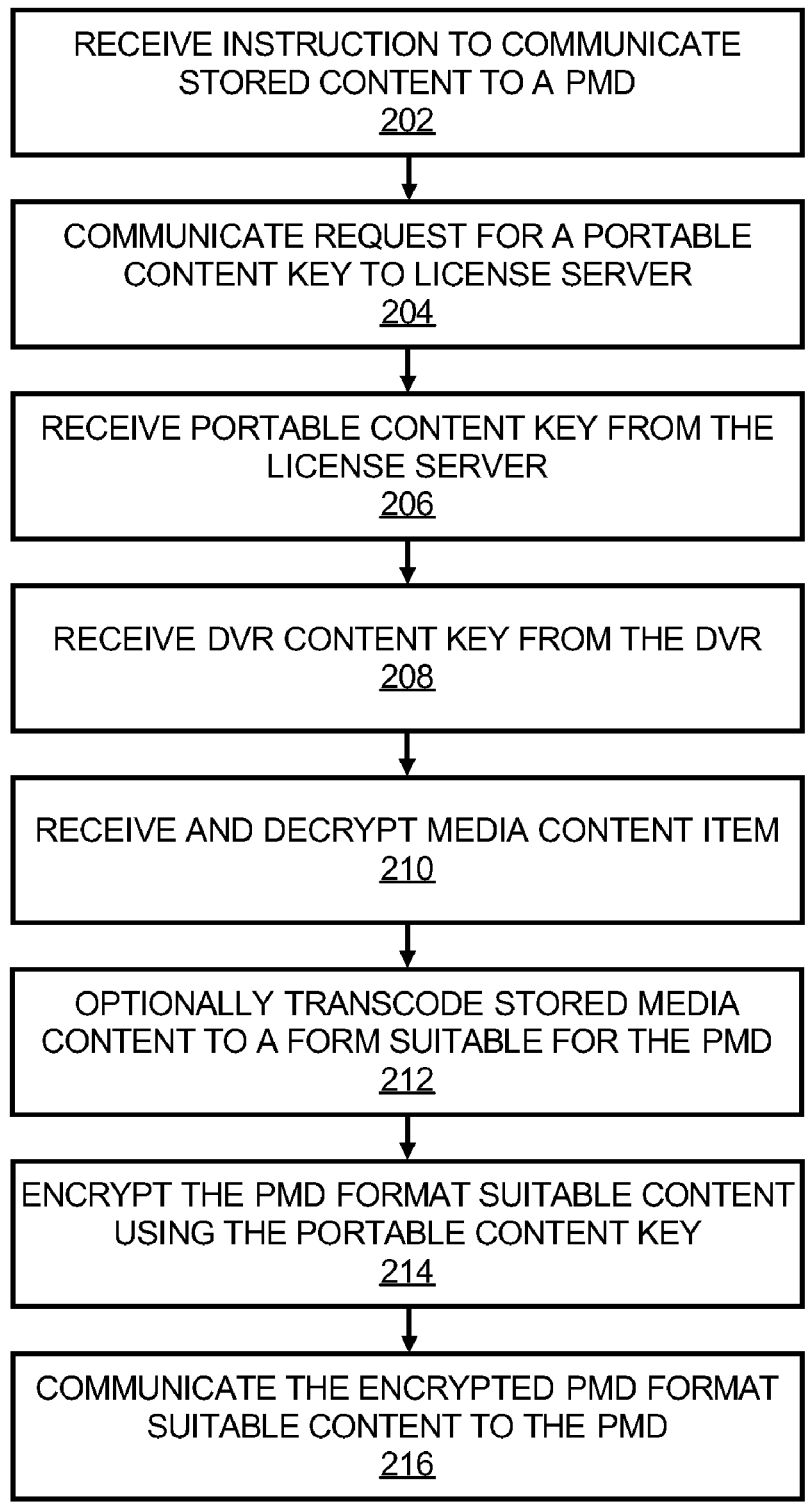
FIGS. 2A and 2B, respectively, illustrate flow diagrams of methods for communicating media content stored on a digital video recorder (DVR) to a digital rights management protected portable multimedia device, according to two embodiments.

With reference first to FIG. 2A, there is shown a flow diagram of a method 200 for communicating media content stored on the DVR 102 to a DRM protected PMD 120, according to an embodiment. One or more of the steps contained in the method 200 may be performed by the rights manager 130. As discussed above, the rights manager 130 may comprise an apparatus that is separate from the DVR 102 and configured to communicate with the DVR 102, such as, a dongle through a USB connection, or other device external to the DVR 102 configured to at least perform the functions discussed below.

In an alternate embodiment, the rights manager 130 may be integrated into the DVR 102. In this embodiment, the DVR 102 may include circuitry and/or software configured to perform the functions of the rights manager 130 discussed below. The circuitry and/or software may be embedded into the DVR 102 in various manners that may make it difficult or impossible to distinguish the circuitry and/or software from other circuitry and/or software contained in the DVR 102. As such, although particular reference is made below to the rights manager 130, it should be understood that in various instances, the DVR 102 or other components of the DVR 102 may be configured to perform all of the functions discussed below with respect to the rights manager 130.

At step 202, the rights manager 130 receives an instruction to communicate a particular media content item stored on the DVR 102 to the PMD 120. The rights manager 130 may receive the instruction from a user directly through a user-interface of the DVR 102, for instance, through the DVR interface module 132. In addition, or alternatively, the rights manager 130 may receive the instruction from a user interaction with the PMD 120, for instance, through the PMD interface module 138.

At step 204, the rights manager 130 communicates a request for a portable content key associated with a content identification (ID) of the stored media content item to the license server 140. The rights manager 130 may be configured to communicate to the license server 140 either directly or via a connection between the DVR 102 and the license server 140. Thus, for instance, the rights manager 130 may be equipped with an optional communications module 137 for communicating with the license server 140 through any of the communication options discussed above with respect to the DVR 102.

The content ID generally comprises a substantially unique identification value assigned to the media content item. Thus, for instance, various media content items stored on the DVR 102 will be assigned different content IDs. The DVR 102 may utilize the content ID to be able to distinguish between the various media content stored on the DVR 102.

According to an embodiment, the DVR 102 is configured to generate the content ID of the media content item, for instance, when the media content item is stored on the DVR 102 or when a request for the portable content key associated with a media content item is made. In instances where the media content item is transcoded, the DVR 102 or the rights manager 130 may associate a new portable content ID with the transcoded media content item to clearly differentiate the original media content item from the one transcoded for use by the PMD 120. In this case, all communication to the license server 140 uses the portable content ID instead of the DVR content ID. In another embodiment, another component, such as the content server 150 or the license server 140 may generate the content ID.

Figure 3:
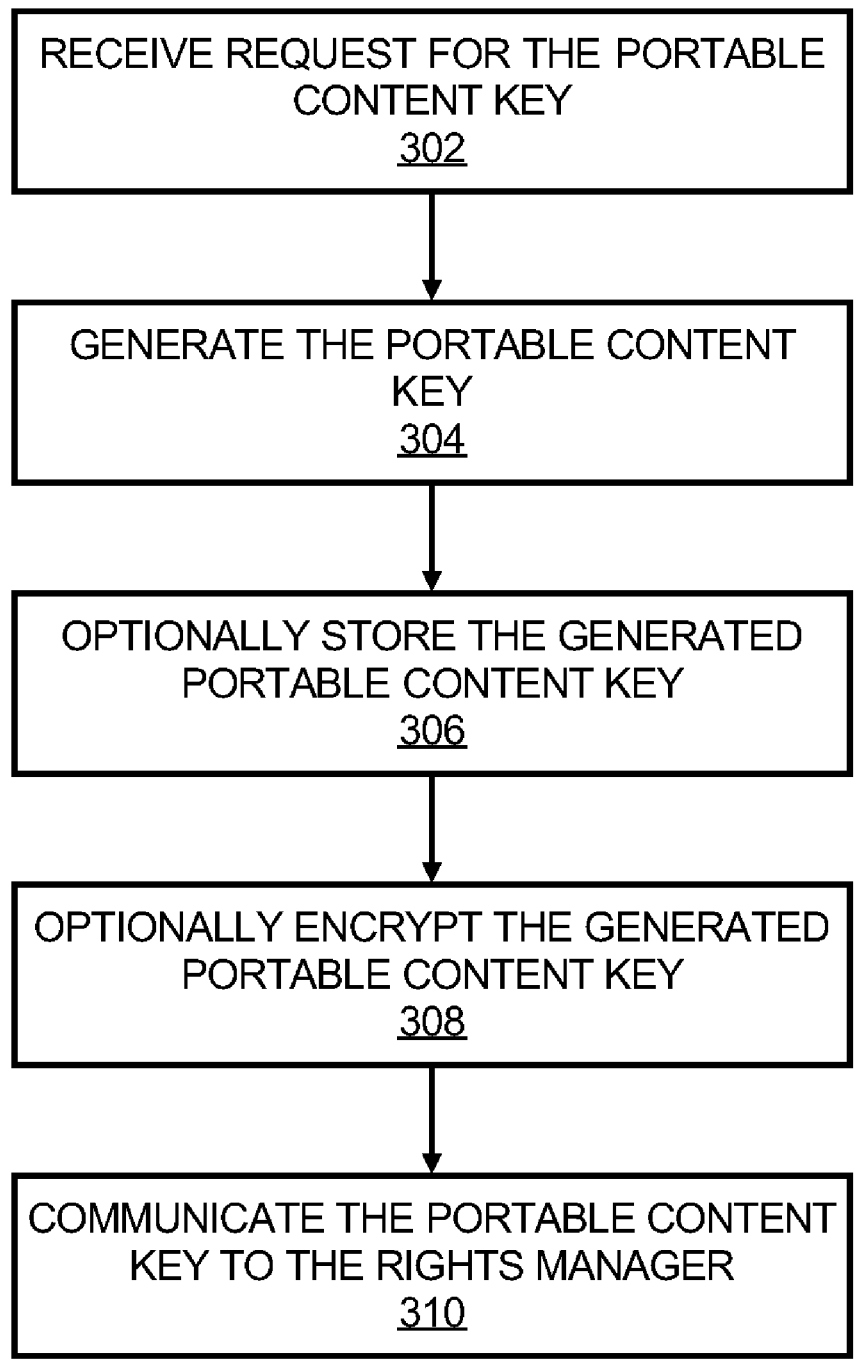
FIG. 3 illustrates a flow diagram of a method of generating and communicating a content key, according to an embodiment.

In any regard, the license server 140 is configured to receive the request from the rights manager 130 as discussed in greater detail with respect to the method 300 depicted in FIG. 3. FIG. 3, more particularly, depicts a flow diagram of a method 300 of generating and communicating a portable content key, according to an embodiment. As such, the license server 140 is configured to perform the method 300.

As shown in the method 300, the license server 140 receives a request for the portable content key from the rights manager 130 at step 302. The request includes the content ID of the media content item to be communicated to the PMD 120. Typically, protected content is associated with DRM rights and constraints that also need to be communicated to the DRM system on the PMD 120 together with the portable content key. These rights may be communicated to the license server 140 at this step. This communication may use a secure protocol, such that the DRM rights cannot be illegally altered. The DVR's DRM security protocol may be used or other security protocols such as SSL or TLS may be utilized.

In addition, the DVR content key generally comprises a key that is related to enabling the media content stored on the DVR to be translated into a format that is suitable for the PMD 120. In other words, the DVR content key enables the media content to be converted into a format that complies with the digital rights management system of the PMD 120 by decrypting the original content using the DVR content key before the content is optionally transcoded at step 212 and further re-encrypted using the portable content key at step 214. By way of particular example, the portable content key may enable the media content item to comply with the Windows™ Media DRM for portable devices protocol.

At step 304, the license server 140 generates the portable content key associated with the content ID of the media content item. The license server 140 may generate the portable content key through implementation of any suitable key generation operation. In one embodiment, the license server 140 is configured to generate the portable content key through implementation of a deterministic operation based upon the content ID.

According to an embodiment, the license server 140 communicates the portable content key to the rights manager 130, as indicated at step 310. In this embodiment, the license server 140 may discard the portable content key following communication of the portable content key to the DVR 102 or the rights manager 130. The license server 140 may discard the portable content key in instances where the license server 140 generates the portable content key deterministically from the content ID because the license server 140 may generate the same portable content key from the same content ID when a request for the portable content key is received at a later time.

According to another embodiment, at step 306, the license server 140 may store the portable content key in the database 142, for instance, to enable the license server 140 to be able to retrieve the portable content key when the license server 140 receives another request for the portable content key associated with the same particular content ID. This is particularly important when the DVR media content item is associated with DRM rules that must be stored by the license server when it communicates the portable content key to the PMD at step 406. In addition, or alternatively, the license server 140 may encrypt the portable content key at step 308 prior to communicating the portable content key to the rights manager 130. As such, in this embodiment, the license server 140 communicates the encrypted portable content key to the rights manager 130 at step 310, for instance, using the same security protocol as at step 302.

In the embodiment in which the license server 140 stores the portable content key, the license server 140 may be configured to automatically delete the stored portable content key in response to receipt of information from the PMD 120 at step 510. This may not be desirable if multiple PMDs 120 owned by the user will receive the DVR media content and may be requesting the same portable content key from the license server 140. Alternatively, when the media content associated with the portable content key is deleted from the DVR 102, the DVR 102 may be configured to communicate this information to the license server 140. The license server 140 may then be configured to delete the stored portable content key since this key will no longer be required.

With reference back to FIG. 2, at step 206, the rights manager 130 receives the portable content key from the license server 140. The rights manager 130 may also store the portable content key in a memory (not shown). At step 208, the rights manager 130 receives the DVR content key from the DVR 102. Alternatively, the rights manager 130 may have received the DVR content key from the DVR 102 at step 202. In addition, at step 210, the rights manager 130 may receive the media content item from the DVR 102 and may decrypt the media content item using the DVR content key.

At step 212, the transcoding module 136 of the rights manager 130 optionally transcodes the media content to a format suitable for the PMD 120, which also includes a format that complies with one or more DRM systems supported by the PMD 120. A suitable format includes, for instance, the Windows™ Media DRM for portable devices. In addition, at step 214, the encryption/decryption module 134 of the rights manager 130 encrypts the PMD format suitable content using the portable content key. According to an embodiment, steps 210-214 may be executed in a loop such that the media content is decrypted, transcoded and re-encrypted in small increments (e.g. packets, frames, video access units, etc.). If the DRM system on the DVR 102 and the DRM system on the PMD 120 use the same media content format and encryption algorithm, the transcoding step 212 and the re-encryption step 214 may be omitted. In addition, steps 208 and 210 may also be considered to be optional in this case.

At step 216, the encrypted content is communicated to the PMD 120 through either a direct connection between the rights manager 130 and the PMD 120 or through a connection between the DVR 102 and the PMD 120 or through a removable media, such as an SD card.

Figure 2B:
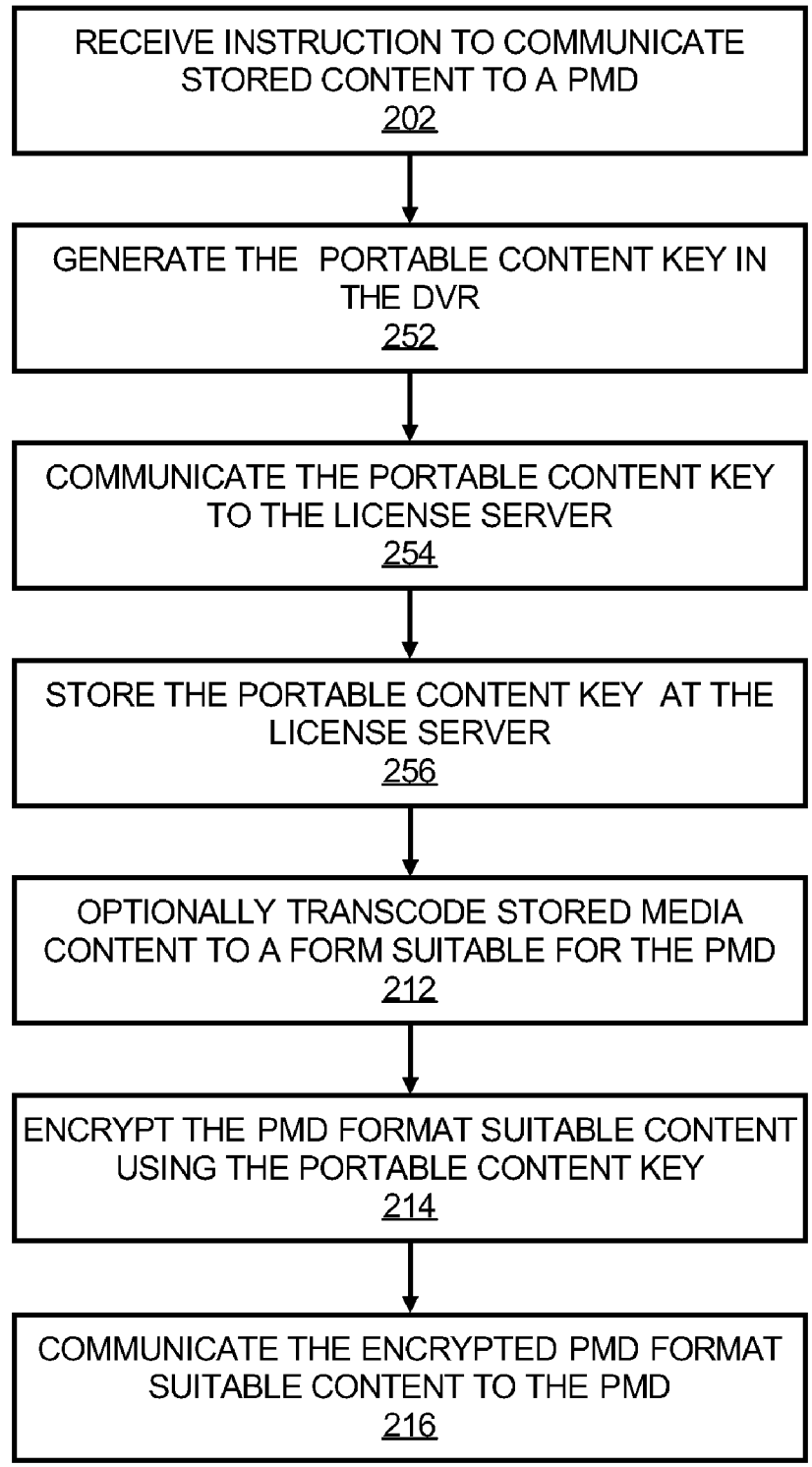

Turning now to FIG. 2B, there is shown a flow diagram of a method 250 for communicating media content stored on the DVR 102 to a DRM protected PMD 120, according to another embodiment. In this embodiment, the portable content key is generated in the DVR 102 instead of by the license server 140. In addition, similarly to the method 200, one or more of the steps contained in the method 250 may be performed by the rights manager 130.

At step 202, the DVR 102 receives an instruction to communicate a particular media content item stored on the DVR 102 to the PMD 120 as discussed above with respect to the method 200. In addition, at step 252, a portable content key is generated by the DVR 102 instead of the license server 140.

At step 254, the DVR 102 communicates the portable content key to the license server 140 and the license server 140 stores the portable content key as indicated at step 256. Although not explicitly stated, the license server 140 may also receive and store the DRM rules associated with the media content at step 256. This communication of the portable content key, portable content id and the DRM rules may be done through a secure protocol similar to step 308.

In addition, steps 212-216 as discussed above with respect to the method 200 may be performed in the method 250.

Turning now to FIG. 4, there is shown a flow diagram of a method 400 of enabling media content from the DVR 102 to be accessed in the PMD 120. As such, the PMD 120 is configured to perform the method 400.

At step 402, the PMD 120 receives the encrypted content from the rights manager 130. The PMD 120 also receives the portable content ID of the media content item. The content ID may be optionally stored in the content file itself, such as in the file header. At this point, the PMD 120 is unable to access the encrypted PMD format suitable content because the PMD 120 does not have the appropriate key to decrypt the encrypted PMD format suitable content.

At step 404, the PMD 120 communicates a request for a portable content key from the license server 140, which includes the content ID. Again, as discussed above, the PMD 120 may communicate directly to the license server 140 or via the connection between the DVR 102/rights manager 130 and the license server 140. The portable content key generally comprises a key that is related to enabling the decryption of a media content item that the rights manager 130 has encrypted to be into a format that complies with the digital rights management system of the PMD 120. By way of particular example, the PMD 120 executes typical Windows™ Media DRM (WMDRM) transactions to obtain the content key and the associated DRM rules in the form of a WMDRM license request from the PMD 120 and WMDRM license response from the license server 140; the portable content key may enable the media content to be decrypted such that it complies with the WMDRM for portable devices. Another example may include a Rights Object request from the PMD 120 to the Rights Issuer to receive a Rights Object with the content key and the DRM rules compliant with the OMA DRM specification.

In any regard, the license server 140 is configured to receive the request from the PMD 120 as discussed in greater detail with respect to the method 500 depicted in FIG. 5. FIG. 5 depicts a method of generating and communicating a portable content key, according to an embodiment. As such, the license server 140 is configured to perform the method 500.

As shown in the method 500, the license server 140 receives a request for the portable content key from the PMD 120 at step 502. The request includes the content ID of the media content communicated to the PMD 120.

At step 504, the license server 140 generates the portable content key associated with the content ID of the media content item. The license server 140 may generate the portable content key through implementation of any suitable key generation operation. In one embodiment, the license server 140 is configured to generate the portable content key through implementation of a deterministic operation based upon the content ID.

According to an embodiment, the license server 140 communicates the portable content key to the PMD 120, as indicated at step 510. In this embodiment, the license server 140 may discard the portable content key following communication of the portable content key to the PMD 120. The license server 140 may discard the portable content key in instances where the license server 140 generates the portable content key deterministically from the content ID because the license server 140 may generate the same portable content key from the same content ID when a request for the portable content key is received at a later time.

According to another embodiment that corresponds to the method 250 depicted in FIG. 2B, step 504 may be replaced by step 506, where the license server 140 retrieves the portable content key from the database 142 when the license server 140 receives a request for the portable content key associated with a particular content ID. In this embodiment, the portable content key received from the DVR 102 was stored by the license server 140 at step 256. In addition, the license server 140 encrypts the portable content key at step 508 prior to communicating the portable content key to the PMD 120. As such, at step 510, the license server 140 communicates the encrypted portable content key to the PMD 120 using the standard mechanism of the PMD's 120 DRM system.

With reference back to FIG. 4, at step 406, the PMD 120 receives the portable content key from the license server 140. At step 408, the PMD 120 decrypts the portable content key according to the PMD's 120 DRM system. In addition, at step 410, the PMD 120 decrypts the encrypted PMD format suitable content with the portable content key to thereby access the PMD format suitable content. If DRM rules were received with the portable content key, the PMD's 120 DRM system may enforce those rules before decrypting the content key and the content item in steps 408 and 410, respectively.

Through implementation of the methods 200-500, media content stored on the DVR 102 may be communicated to and played by the PMD 120. More particularly, the PMD 120 is able to access and play the media content because the media content is transcoded to a suitable format for playback on the PMD 120. In addition, the communication of the transcoded content is secure because the PMD 120 is unable to access the transcoded content without receiving the appropriate portable content key from the license server 140. In one particular regard, the PMD's 120 DRM system may be used with no modification or extensions to obtain the portable content key for the content originating from the DVR 102 instead of the more traditional way of receiving content from the content server 150.

Some or all of the operations set forth in the methods 200-500 may be contained as a utility, program, or subprogram, in one or more desired computer readable storage media. In addition, the methods 200-500 may be embodied by one or more computer programs, which can exist in a variety of forms both active and inactive. For example, they may exist as software program(s) comprised of program instructions in source code, object code, executable code or other formats. Any of the above may be embodied on one or more computer readable storage media, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 6:
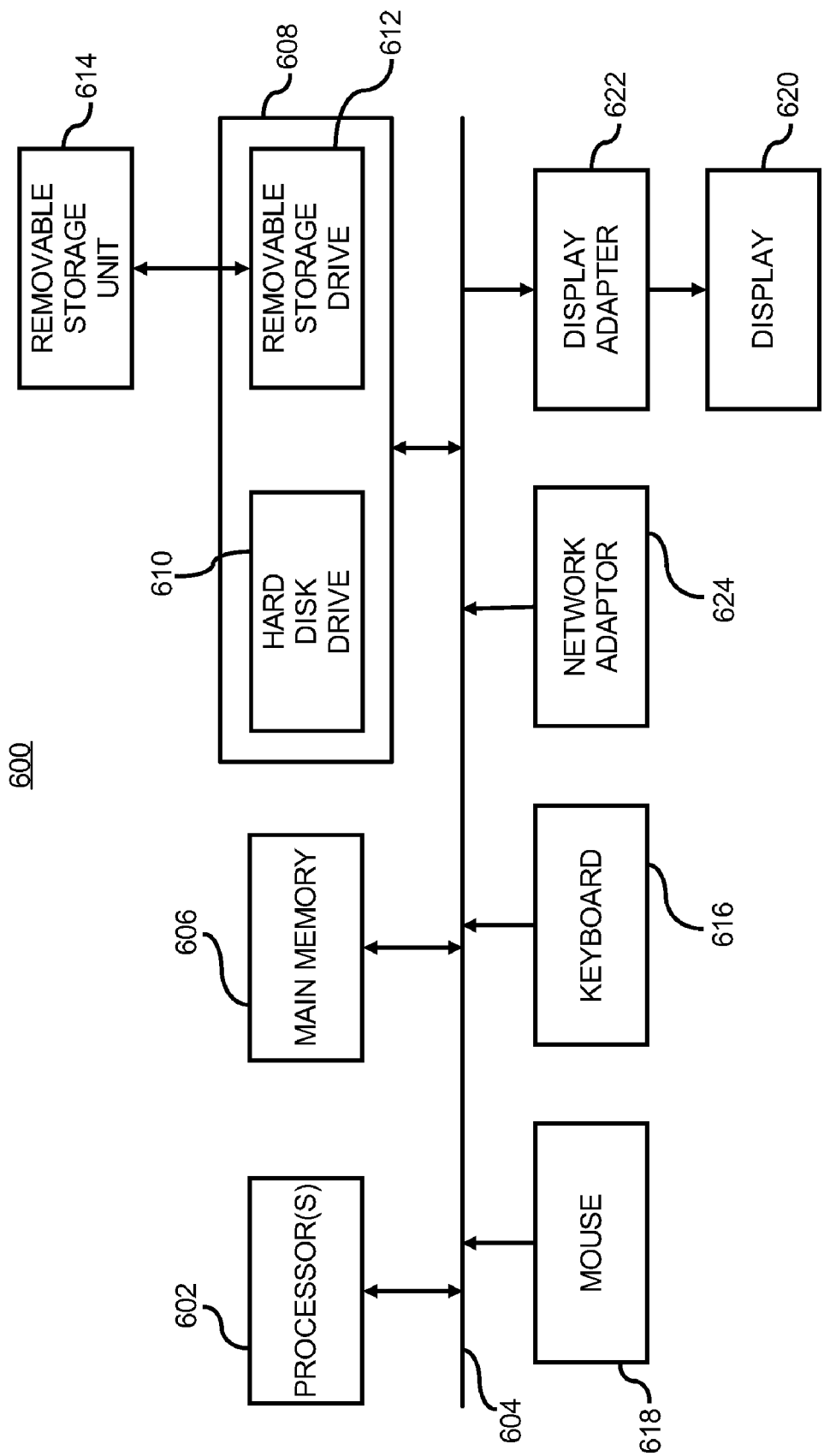
FIG. 6 shows a block diagram of a computing apparatus configured to implement or execute one or more of the methods depicted in FIGS. 2A-5.

FIG. 6 illustrates a block diagram of a computing apparatus 600 configured to implement or execute one or more of the methods 200-500 depicted in FIGS. 2A-5, according to an embodiment. It should be understood that the illustration of the computing apparatus 600 is a generalized illustration and that the computing apparatus 600 may include additional components and that some of the components described may be removed and/or modified without departing from a scope of the computing apparatus 600.

The computing apparatus 600 includes a processor 602 that may implement or execute some or all of the steps described in one or more of the methods 200-500. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for one or more of the methods 200-500 may be stored.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

It will be apparent to one of ordinary skill in the art that other known electronic components may be added or substituted in the computing apparatus 600. It should also be apparent that one or more of the components depicted in FIG. 6 may be optional (for instance, user input devices, secondary memory, etc.).

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method for communicating media content stored on a digital video recorder (DVR) protected by a first digital rights management (DRM) system to a portable multimedia device (PMD) using a second DRM system, wherein the first DRM system differs from said second DRM system, said method comprising using one or more processors to perform steps of:
    (a) receiving a request for communication of a media content item stored on the DVR to the PMD;
    (b) employing a portable content key to encrypt the media content item to a PMD format suitable content version; and
    (c) communicating the encrypted PMD format suitable content version to the PMD along with a portable content identifier (ID), wherein the portable content ID comprises a unique identification value assigned to the media content item.

2. The method according to claim 1, further comprising using the one or more processors to perform steps of:
    communicating a request for the portable content key associated with a portable content ID of the stored media content item to a license server; and
    receiving the portable content key associated with the portable content ID from the license server prior to step (b).

3. The method according to claim 2, further comprising:
    employing a secure protocol for one or both of communicating the request for the portable content key and receiving the portable content key.

4. The method according to claim 2, further comprising:
    in the license server,
        generating the portable content key in response to receipt of the request for the portable content key associated with the content ID of the media content item; and
        communicating the portable content key to the DVR.

5. The method according to claim 4, further comprising:
    storing the generated portable content key in a database.

6. The method according to claim 2, further comprising:
    receiving DRM rules associated with the media content item from the DVR and storing the DRM rules associated with the media content item.

7. The method according to claim 5, further comprising:
    determining that the media content item has been deleted from the DVR;
    communicating an indication to the license sever that the media content item has been deleted from the DVR; and
    in the license server, deleting the portable content key from the database.

8. The method according to claim 4, further comprising:
    in the license server,
        encrypting the portable content key; and
        wherein communicating the portable content key further comprises communicating the encrypted portable content key; and
    wherein receiving the portable content key further comprises receiving the encrypted portable content key, said method further comprising:
    decrypting the encrypted portable content key prior to step (b).

9. The method according to claim 1, further comprising:
    generating the portable content key in the DVR prior to step (b); and
    communicating the portable content key to a license server, wherein the license server is configured to store the portable content key.

10. The method according to claim 1, wherein the media content item stored on the DVR is encrypted, said method further comprising:
    receiving a DVR content key; and
    decrypting the media content item using the DVR content key prior to step (b).

11. The method according to claim 1, wherein one or more of steps (a)-(c) are performed by a rights manager.

12. The method according to claim 11, wherein the rights manager comprises an apparatus that is separable from the DVR.

13. A rights manager for transforming a media content from a first digital rights management (DRM) format suitable for a digital video recorder (DVR) to a second DRM format suitable for a portable multimedia device (PMD), said rights manager comprising a processor, wherein the processor further comprises:
- a module for receiving a media content identification (ID) of the media content stored on the DVR;
- a module for receiving a DVR content key of the media content stored on the DVR;
- a module for decrypting the DVR format suitable content version of a media content item using a DVR content key;
- a module for encrypting a PMD format suitable content version of a media content item using a portable content key; and
- a module for communicating the encrypted PMD format suitable content version to the PMD along with a portable content identifier (ID), wherein the portable content ID comprises a unique identification value assigned to the media content item.

14. The rights manager according to claim 13, wherein the processor further comprises:
- a module for interfacing directly with the PMD.

15. The rights manager according to claim 13, wherein the rights manager is an apparatus that is separate and distinct from the DVR.

16. The rights manager according to claim 13, wherein the rights manager is integrated into the DVR.

17. A non-transitory computer readable storage medium on which is embedded one or more computer programs, said one or more computer programs implementing a method for communicating media content stored on a digital video recorder (DVR) protected by a first DRM system to a portable multimedia device (PMD) using a second DRM system, wherein the first DRM system differs from said second DRM system, said one or more computer programs comprising a set of instructions for:
- (a) receiving a request for communication of a media content item stored on the DVR to the PMD;
- (b) employing a portable content key to encrypt the media content item to a PMD format suitable content version; and
- (c) communicating the encrypted PMD format suitable content version to the PMD along with a portable content identifier (ID), wherein the portable content ID comprises a unique identification value assigned to the media content item.

18. The non-transitory computer readable storage medium according to claim 17, said one or more computer programs further including a set of instructions for:
generating the portable content key in one of the DVR and the license server.

19. The non-transitory computer readable storage medium according to claim 17, said one or more computer programs further including a set of instructions for:
communicating a request for the portable content key associated with a content identification (ID) of the stored media content to a license server; and
receiving the portable content key associated with the content ID from the license sever prior to step (b).

20. The non-transitory computer readable storage medium according to claim 19, said one or more computer programs further including a set of instructions for:
employing a secure protocol in communicating the request for the portable content key to the license server.

* * * * *